UNITED STATES PATENT OFFICE.

JOSEPH DEINET, OF ELBERFELD, GERMANY, ASSIGNOR TO FARBENFABRIKEN VORM. FRIEDR. BAYER & CO., OF ELBERFELD, GERMANY, A CORPORATION OF GERMANY.

VAT COLORING-MATTER.

938,618.
Specification of Letters Patent.
Patented Nov. 2, 1909.

No Drawing. Application filed May 15, 1909. Serial No. 496,114.

*To all whom it may concern:*

Be it known that I, JOSEPH DEINET, citizen of the German Empire, residing at Elberfeld, Germany, have invented new and useful Improvements in Vat Coloring-Matter, of which the following is a specification.

My invention relates to the production of a new anthracene derivative. It is obtained by converting the 1.5-diaminoanthraquinone into its dibenzoylated derivative. The reaction is carried out by treating 1.5-diaminoanthraquinone with benzoyl chlorid.

Example: 10 parts of 1.5-diaminoanthraquinone are heated to boiling for about half an hour with 100 parts of nitrobenzene and 40 parts of benzoyl chlorid. The new condensation product crystallizes from the cooling liquid in the shape of orange crystals which are filtered off and dried. It is soluble in pyridin with a yellow color, in concentrated sulfuric acid with a red color. By treatment with hydrosulfite and NaOH a violet-red vat is obtained which dyes cotton, wool or silk orange-yellow shades.

I claim:

The herein described new vat dyestuff of the anthracene series which is the 1.5-dibenzoyldiaminoanthraquinone, which dyestuff is, after being dried and pulverized, an orange powder which is soluble in pyridin with a yellow color; soluble in concentrated sulfuric acid with a red color; giving a violet-red vat with hydrosulfite and caustic soda lye, which vat dyes the textile fiber orange-yellow shades, substantially as described.

In testimony whereof I have hereunto set my hand in the presence of two subscribing witnesses.

JOSEPH DEINET. [L. S.]

Witnesses:
OTTO KÖNIG,
C. J. WRIGHT.